T. R. BEGGS.
VALVE.
APPLICATION FILED SEPT. 22, 1908.
972,430.  Patented Oct. 11, 1910.
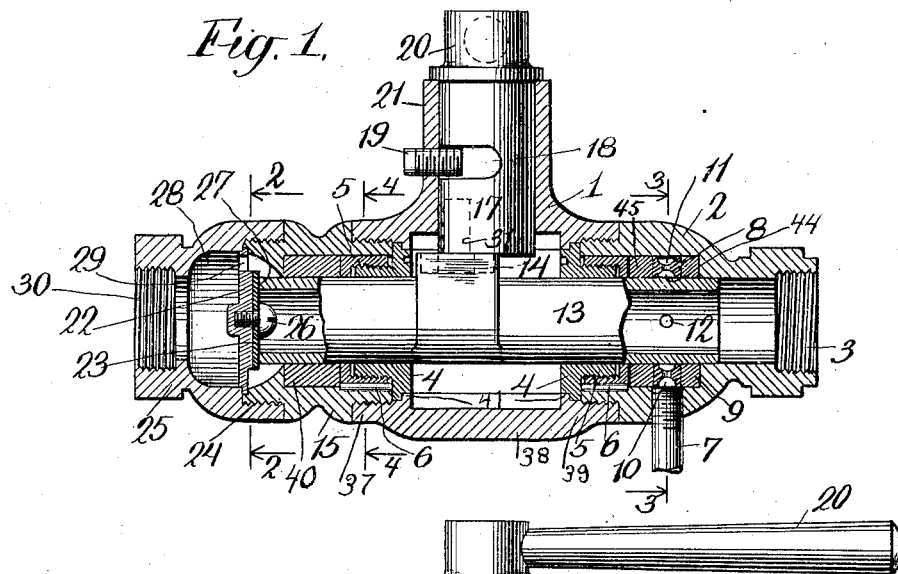
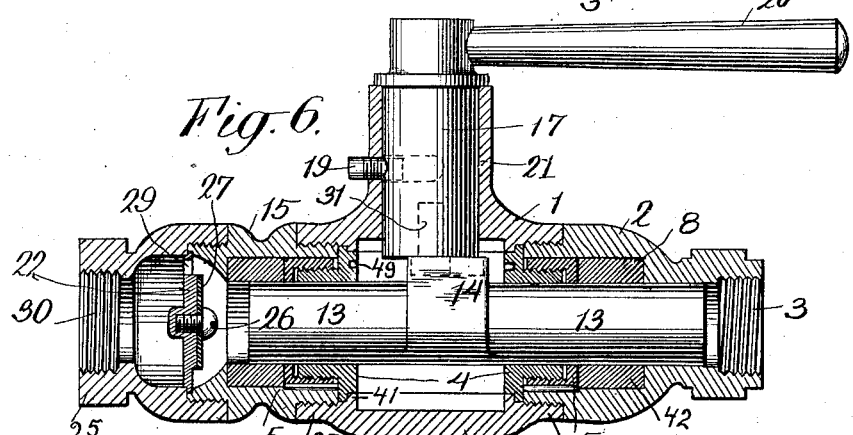
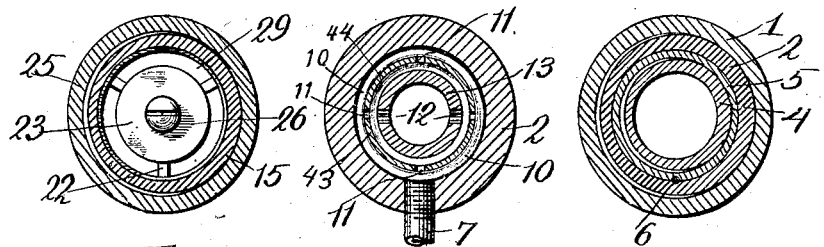
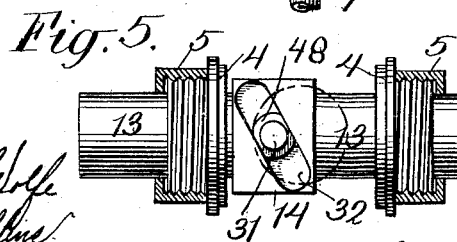
WITNESSES
INVENTOR
Thomas R. Beggs
BY
Duncan & Duncan ATTORNEYS

UNITED STATES PATENT OFFICE.

THOMAS R. BEGGS, OF ENGLEWOOD, NEW JERSEY, ASSIGNOR TO THE THOMAS R. BEGGS FAUCET AND VALVE COMPANY, OF ENGLEWOOD, NEW JERSEY, A CORPORATION OF NEW JERSEY.

VALVE.

972,430.   Specification of Letters Patent.   Patented Oct. 11, 1910.

Application filed September 22, 1908.  Serial No. 454,203.

*To all whom it may concern:*

Be it known that I, THOMAS R. BEGGS, a citizen of the United States, and resident of Englewood, Bergen county, State of New Jersey, have made a certain new and useful Invention Relating to Valves, of which the following is a specification, taken in connection with the accompanying drawing, forming part of the same.

This invention relates to valves and relates especially to waste valves having a longitudinally movable tubular valve such as may be used for stop and waste valves, for example.

In the accompanying drawing showing in a somewhat diagrammatic manner illustrative embodiments of this invention, Figure 1 is a longitudinal central section. Fig. 2 is a transverse section substantially along the line 2—2 of Fig. 1. Fig. 3 is another transverse section substantially along the line 3—3 of Fig. 1. Fig. 4 is a similar transverse section taken substantially along the line 4—4 of Fig. 1. Fig. 5 is a partial horizontal section showing the valve and coöperating sleeves and bushings; and Fig. 6 is a longitudinal vertical section showing a modified form of valve.

In the illustrative embodiment of this invention shown in Figs. 1 to 5, the valve casing may as indicated comprise a central casing section 1 having a plurality of separated bars 38 connecting the threaded collars 37, 39. Suitable end casing sections may be formed with coöperating threaded portions to engage the threaded collars so as to form a rigid valve casing, the end section 2 being in this way connected with the collar 38 and having a suitable connection which may be in the form of an internal threaded portion 3 at its outer end. The shut-off casing at the other end may if desired be made in a plurality of parts or sections for convenience of construction, the section 25 being as indicated provided with the threaded portion 24 by which it is secured to the coöperating section 15, in this way rigidly clamping the spider or support 22 in position in its recess between these two parts so as to properly support the shut-off washer 27 which may be secured in any desired way as by the screw 26 upon this support or spider which is provided with the peripheral passages 29 as indicated in Figs. 1 and 2. This end casing section may have a similar threaded connection 30 and be screwed to the collar 37 so as to form a rigid supporting valve casing within which the tubular valve 13 is held after the parts have been assembled as indicated.

Each end section may be provided with suitable packing adjustably held in coöperation with the valve. For example, the packing 40 formed of any desired material, such as compressed asbestos or other fibrous material impregnated with paraffin or other lubricating or cementing medium may be mounted in the end casing section and held in position by suitable adjustable means, preferably adapted to be adjusted from the apertures in the central casing section. For this purpose each of the end casing sections may be provided with a suitable bushing 5 having a threaded portion on its inner face if desired and having suitable alining means preventing its rotation, such for example, as the alining pin or member 6 in a longitudinal recess in this bushing and the adjacent portion of the casing. The threaded sleeve 4 coöperates with this bushing and as indicated may be provided with a flange seated in a suitable recess in the casing and held against longitudinal movement as by the coöperating flange 41. It will be apparent of course that by rotating these sleeves their threaded engagement with the bushings forces the bushings against the packings with the desired force, compressing the same as firmly as desired against the centrally located tubular valve, the sleeves being of course rotated by any desired mechanical means, as for instance by suitable levers having suitable lugs to engage coöperating holes 49 in the sleeve flanges. If desired, a suitable waste ring 8 may be interposed in the packing 9, 45, in one of these end casing sections so as to coöperate with suitable waste apertures 12 formed in the valve. This waste ring of metal or other suitable material may as indicated in Figs. 1 and 3 be provided with a narrow internal annular recess 44 and a corresponding external recess 10 joined by a plurality of radial passages 11 so as to insure the discharge of fluid from the waste ports or apertures 12 in the valve through the waste pipe 7 in the casing when the valve is brought into closed position so that the waste ports register with the narrow internal recess in the waste ring.

The tubular valve may be longitudinally operated in the casing by any desired means, such, for example, as the stem 17 revolubly mounted in the head 21 of the central casing section 1, the stem preferably having the guide slot 18 with which the stop pin 19 engages so as to limit the extent to which the stem may be rotated by its handle which may be in the form of a suitable wheel or lever 20. The stem may be provided with a suitable eccentrically located operating pin 31 projecting into a coöperating inclined operating slot 32 in the valve block 14 formed integral with or otherwise secured to the tubular valve. If desired, a suitable slide 48 may be interposed between the pin and slot to minimize wear, as shown in Fig. 5.

It is not of course necessary to provide the valve with the waste ring and ports and in such case the valve might have the construction indicated in Fig. 6 in which the tubular valve is shown as withdrawn from engagement with the closing washer 27 so that the water or other fluid passing through the tubular valve 13 could pass through the apertures 29 in the spider, the parts being so constructed as to naturally clear themselves of dirt or other material so that the opening and closing of the valve could not be readily interfered with.

Having described this invention in connection with a number of illustrative embodiments thereof, to the details of which disclosure the invention is not of course to be limited, what is claimed as new and what is desired to be secured by Letters Patent is set forth in the appended claims.

I claim—

1. In valves, a casing comprising a central casing section having threaded collars united by a plurality of separated bars, end casing sections having threaded portions engaging said threaded collars, a tubular valve movably mounted within said casing, each of said end sections being provided with a seat, packing supported in said seat in coöperation with said valve, an interiorly threaded bushing coacting with said packing and provided with alining means coöperating with a slot in said casing, and a sleeve having a threaded portion engaging the threads of said bushing and provided with a flange revolubly mounted in a recess formed in said casing, said sleeve having exposed rotating means to adjust said bushing from said central casing section, one of said end casing sections having a spider provided with peripheral passages and a shut-off washer mounted on said spider to coöperate with said tubular valve and one of said end casing sections having a waste ring coöperating with a waste pipe in said casing and with a waste aperture in said tubular valve when said valve is in closed position, an integral valve block having an operating slot on said tubular valve, a stem mounted in said central casing section and having a guide slot therein, a stop pin coöperating with said guide slot and limiting the movement of said stem, a handle on said stem, an eccentric operating pin on said stem and a slide in said operating slot coöperating with said pin to reciprocate said valve as said stem is rotated.

2. In valves, a casing comprising a central casing section having threaded collars united by a plurality of separated portions, end casing sections having threaded portions engaging said threaded collars, a tubular valve movably mounted within said casing, each of said end sections being provided with a seat, packings supported in said seat in coöperation with said valve, an interiorly threaded bushing coacting with said packing and provided with alining means coöperating with said casing and a sleeve having a threaded portion engaging the threads of said bushing and provided with a flange revolubly mounted in said casing, said sleeve having exposed rotating means to adjust said bushing from said central casing section, one of said end casing sections having a spider provided with peripheral passages and a shut-off washer mounted on said spider to coöperate with said tubular valve and one of said end casing sections having an apertured waste ring coöperating with a waste pipe in said casing and with a waste aperture in said tubular valve when said valve is in closed position and means to reciprocate said valve.

3. In valves, a casing comprising a central casing section having collars, end casing sections having portions fastened to said collars, a tubular valve movably mounted within said casing, each of said end sections being provided with a seat, packings supported in said seat in coöperation with said valve and an interiorly threaded bushing coacting with said packing and provided with alining means coöperating with said casing and a sleeve having a threaded portion engaging the threads of said bushing and provided with a flange revolubly mounted in said casing, means to rotate said sleeve and thereby adjust said bushing, means coöperating with the end of said tubular valve when in closed position, means to reciprocate said valve, said valve having a waste aperture and a waste passage formed in said casing and coöperating with said waste aperture when said valve is in closed position.

4. In valves, a sectional casing comprising a plurality of connected parts, a shut-off spider clamped in a recess between said parts, a tubular valve mounted to reciprocate in said casing and coöperate with said shut-off spider, an integral valve block on said valve provided with a diagonal operating slot, a stem mounted in said casing and having a guide slot therein, a stop coöperating with said guide slot and limiting the movement of said stem, a handle on said stem, an eccentric operating pin on said stem and a slide in said operating slot and coöperating with said pin to reciprocate said valve as said stem is rotated.

5. In valves, a sectional casing provided with packings and with shut-off means, a tubular valve provided with a waste aperture and mounted to move longitudinally in said casing to coöperate with said shut-off means and thereby close the open end of said tubular valve, a waste passage in said casing coöperating with said waste aperture when said valve is in closed position and operating means to move said valve.

THOMAS R. BEGGS.

Witnesses:
 HARRY L. DUNCAN,
 JESSIE B. KAY.